(12) United States Patent
Duan et al.

(10) Patent No.: US 8,081,877 B2
(45) Date of Patent: Dec. 20, 2011

(54) METHOD OF DETERMINING AN OPTICAL DISTANCE FOR CHROMATIC DISPERSION COMPENSATION

(75) Inventors: Xiaodong Duan, Pleasanton, CA (US); Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 803 days.

(21) Appl. No.: 12/117,545

(22) Filed: May 8, 2008

(65) Prior Publication Data
US 2009/0279890 A1 Nov. 12, 2009

(51) Int. Cl.
*H04J 14/08* (2006.01)
*H04B 10/12* (2006.01)

(52) U.S. Cl. ............................. 398/98; 398/102; 398/147

(58) Field of Classification Search .................... 398/98, 398/102, 147
See application file for complete search history.

(56) References Cited

U.S. PATENT DOCUMENTS

| | | | | |
|---|---|---|---|---|
| 5,299,044 | A * | 3/1994 | Mosch et al. ................... | 398/35 |
| 6,563,613 | B1 * | 5/2003 | Tochio ............................ | 398/25 |
| 2008/0304834 | A1 * | 12/2008 | Fan et al. ...................... | 398/137 |
| 2009/0047013 | A1 * | 2/2009 | Effenberger .................... | 398/16 |
| 2009/0052897 | A1 * | 2/2009 | Kazawa et al. ................ | 398/71 |
| 2009/0060498 | A1 * | 3/2009 | Libeskind et al. ............. | 398/28 |

* cited by examiner

*Primary Examiner* — Leslie Pascal
(74) *Attorney, Agent, or Firm* — Patterson & Sheridan, L.L.P.

(57) ABSTRACT

A method of determining an optical distance between two nodes of an optical network for chromatic dispersion compensation includes using existing optical supervisory channel components in each node to measure the "time-of-flight" of an optical signal having a known wavelength. The effective optical distance is determined based on the time-of-flight and known wavelength of the optical signal. The computed optical distance may then be used to compensate for the dispersion experienced by the optical signal when transmitted between the two nodes. Advantageously, the method allows tunable dispersion compensation of a wavelength channel to be periodically optimized at each node in response to incremental changes in environmental factors that affect the chromatic dispersion produced between the two nodes or in response to reconfigurations that affect the chromatic dispersion produced between the two nodes.

19 Claims, 2 Drawing Sheets

METHOD OF DETERMINING AN OPTICAL DISTANCE FOR CHROMATIC DISPERSION COMPENSATION

BACKGROUND OF THE INVENTION

1. Field of the Invention

Embodiments of the present invention relate generally to optical communication systems and, more particularly, to a method of determining optical distance for chromatic dispersion compensation.

2. Description of the Related Art

In a wavelength division multiplexing (WDM) optical communication system, information is carried by multiple channels, each channel having a unique wavelength. WDM allows transmission of data from different sources over the same fiber optic link simultaneously, since each data source is assigned a dedicated wavelength channel. The result is an optical communication link with an aggregate bandwidth that increases with the number of wavelengths, or channels, incorporated into the WDM signal. In this way, WDM technology maximizes the use of an available fiber optic infrastructure-what would normally require multiple optical links instead requires only one. As defined herein, an "optical link" refers to an optical communications link established between two nodes in an optical network. An optical link may include a combination of optical fibers or other waveguides, free-space optics, and optical router or other switching apparatus.

When a light wave travels through a medium, such as an optical fiber, each wavelength contained in the light wave travels at a different speed, resulting in chromatic dispersion. Chromatic dispersion leads to signal degradation since the varying delay in arrival time between the different constituent components of a WDM signal causes the different wavelength channels of a WDM signal to arrive at a given destination node at different times. Thus, a misalignment in time is produced between the different wavelength channels of a WDM signal when transmitted from node to node within a system. In addition, chromatic dispersion "smears out" each wavelength channel over time, producing a phenomenon referred to as pulse spreading, i.e., broadening or distorting the profile of each optical pulse over time. Pulse spreading, if uncorrected, typically causes interference between adjacent light pulses, resulting in increased bit rate error.

To date, chromatic dispersion is generally addressed with fixed dispersion compensation. With such an approach, when an optical link between two nodes of an optical network is initially established, the chromatic dispersion of a WDM signal is measured, and an appropriate compensation module is installed in the optical link, such as a dispersion-compensating fiber (DCF). A DCF is an optical fiber connected in series with the signal-transmitting fiber of a link. The DCF has a chromatic dispersion slope opposite in sign to that of the signal-transmitting fiber, which reduces the absolute value of dispersion produced in the optical link.

One drawback to using fixed dispersion compensation is that it is unable to adequately correct for chromatic dispersion in evolving optical networks. For example, as bandwidth requirements for optical communication networks increase, it is desirable to increase the amount of information carried by a single optical fiber. This may be accomplished by increasing the transmission speed, or bit rate, within such networks. As the speed of WDM systems increases beyond 10 Gbps, the magnitude of the pulse spreading and the time offsets between wavelength channels caused by chromatic dispersion can approach the same time scale as the bit rate of the optical system. Because the chromatic dispersion is oftentimes a function of variable environmental conditions, an initial representative measurement of dispersion produced within the optical link may not be able to provide an accurate estimate of chromatic dispersion, especially with the accuracy required by high-speed optical systems.

In addition, the topography of optical networks is too complex for fixed dispersion compensation, as configurable, or dynamic, networks become more common. In configurable optical networks, the optical path from one transmission point to another does not remain constant. Instead, the optical path associated with a given transmission within a network may vary greatly since the network may be reconfigured in response to network utilization and other factors. Because dispersion is proportional to the optical distance traveled by a light wave, any dispersion estimate based on a substantially different optical path than that actually traveled by a light wave is of little practical use for dispersion compensation. For this reason, fixed dispersion compensation has limited utility in configurable networks.

To address these problems, tunable dispersion compensation (TDC) has been developed, which is a process that realigns each wavelength channel in time with the other wavelength channels making up a common WDM signal. Similar to fixed dispersion compensation, TDC is performed at a node in an optical network. Unlike fixed compensation, though, with TDC, the amount of dispersion compensation applied to the different wavelength channels of a WDM signal may be varied. For example, when environmental conditions in the optical link change or when the optical transmission is routed along a different optical path within the system, i.e., along a different combination of waveguides and routers, more or less dispersion compensation may be applied to the different wavelength channels of the WDM signal. For this reason, tunable dispersion compensation is preferred over fixed dispersion compensation for configurable networks.

One problem with TDC, though, is that proper compensation of chromatic dispersion in an optical link requires accurate knowledge of the chromatic dispersion produced in the link. Theoretically calculating all factors affecting chromatic dispersion is impracticable and, hence, unreliable for predicting dispersion in a given link. This is because the refractive index of an optical medium is a function not only of the material making up the optical medium, but also of internal mechanical stresses on the optical medium. Examples of refractive index-altering factors include stresses induced in optical components during installation of the optical network and stresses caused by thermal expansion and contraction of such components, all of which are difficult to quantify. For this reason, current TDC techniques rely on directly measuring dispersion in the optical link. Measuring chromatic dispersion typically involves estimating propagation losses based on pulse transmissions between optical network nodes. For a variety of well-known reasons, this approach is inherently inaccurate and impractical for use in conjunction with TDC. For example, a one-time estimate of the chromatic dispersion ignores subsequent changes in the dispersion, including changes caused by environmental factors, such as thermally-induced stresses in optic fibers, and changes that occur whenever an optical network is reconfigured. In addition, estimating the optical length of a link based on propagation losses does not take into account factors that increase propagation loss but do not add optical length, such as the presence of fiber splices or connectors.

Accordingly, there is a need in the art for a more accurate technique for measuring optical distances for purposes of tunable chromatic dispersion compensation.

SUMMARY OF THE INVENTION

One embodiment of the present invention sets forth a method of determining an optical distance between nodes of an optical communication system for chromatic dispersion compensation. The method includes transmitting a first timing signal from a first node of an optical network to a second node of an optical network using an optical supervisory channel, transmitting a second timing signal from the second node to the first node using the optical supervisory channel, measuring the time interval between the first node transmitting the first timing signal and the first node receiving the second timing signal, and calculating the optical distance between the first and second nodes based on the duration of the time interval.

One advantage of the disclosed method is that it allows tunable dispersion compensation of a wavelength channel to be periodically optimized at each node in response to reconfiguration of an optical network and/or to incremental changes in environmental factors that affect chromatic dispersion between each node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Embodiments of the invention contemplate a method of determining optical distance in an optical link using existing optical supervisor channel (OSC) transceivers and associated hardware. An OSC signal transmitted between adjacent nodes of an optical network determines the "time of flight" of an optical signal having a known wavelength, thereby allowing direct calculation of the optical distance between the two nodes. In this way, tunable dispersion compensation of a wavelength channel can be periodically optimized at each node in response to incremental changes in environmental factors that affect chromatic dispersion produced between the two nodes or in response to network reconfigurations that affect the chromatic dispersion produced between the two nodes.

Figure 1:
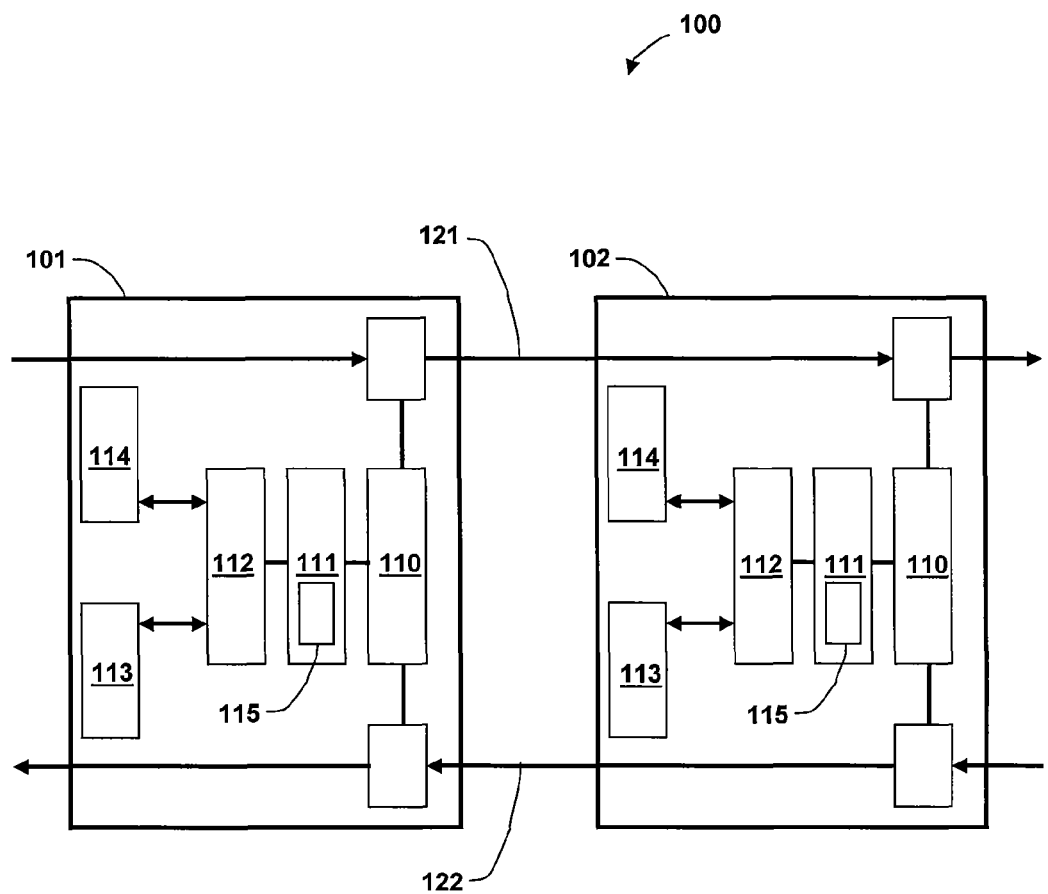
FIG. 1 illustrates a portion of an optical network that includes two nodes, according to one embodiment of the invention.

FIG. 1 illustrates a portion of an optical network 100 that includes two nodes. Nodes 101, 102 are adjacent nodes in optical network 100, e.g., nodes n, n+1, respectively. In addition to other components related to the operation of optical network 100, nodes 101, 102 each include an OSC module 110, an opto-electric transceiver 111, a switching module 112, a field-programmable gate array (FPGA) 114, and a PHY chip 113.

OSC module 110 periodically transmits information required to manage the optical link between nodes 101 and 102, and is commonly known and used in the art. Using a dedicated OSC transmitter (not shown), OSC module 110 typically transmits this information between nodes 101 and 102 at a very low frequency relative to the information-carrying channels. The OSC path, i.e., the path through the optical waveguides and other physical components an OSC signal follows when transmitted from node 101 to node 102, is identical to the optical path through the link between nodes 101 and 102, and which is represented by data lines 121 and 122 in FIG. 1.

Opto-electric transceiver 111 broadcasts and receives WDM signals along data lines 121, 122 to and from adjacent nodes in optical network 100. In the example illustrated in FIG. 1, opto-electric transceiver 111 also includes a TDC module 115, which is configured to perform chromatic dispersion compensation as required on a received WDM signal and/or to perform chromatic dispersion pre-compensation on a WDM signal prior to transmission of the signal.

Switching module 112 is configured to switch control of OSC module 110 between PHY chip 113 and FPGA 114. PHY chip 113 manages OSC module 110 when OSC module 110 is in normal mode, i.e., when OSC module 110 is transmitting the information necessary to supervise the optical link between adjacent nodes in optical network 100. FPGA 114 in node 101, in conjunction with FPGA 114 in node 102, performs the algorithm for measuring the time-of-flight of a signal, i.e., the time required for the signal to travel from node 101 to node 102, thereby allowing calculation of the optical distance between nodes 101 and 102. In one embodiment, PHY chips 113 are Ethernet chips and are adapted to conduct transmissions between adjacent nodes using a standard Ethernet protocol. Similarly, FPGAs 114 are programmed to apply a measurement protocol, described below in conjunction with FIG. 2, that enables OSC module 110 to perform the time-of-flight measurement with the OSC module of an adjacent node.

Each of FPGAs 114 may be contained in a dedicated chip in each node of optical network 100. Alternatively, an FPGA configured as part of TDC module 115 may be adapted to perform the functions of FPGA 114 described above. In another example, an FPGA configured as part of opto-electric transceiver 111 may perform these functions.

As configured, nodes 101, 102 may periodically receive a command for performing an optical length measurement between one another. Each node then switches management of OSC module 110 from PHY chip 113 to FPGA 114 via switching module 112. The OSC modules 110 in nodes 101 and 102 then perform the measurement protocol described below in conjunction with FIG. 2. After the optical length measurement is completed, each of nodes 101, 102 switches management of OSC module 110 from FPGA 114 back to PHY chip 113 via switching module 112 for standard OSC operation using normal Ethernet protocol.

Figure 2:
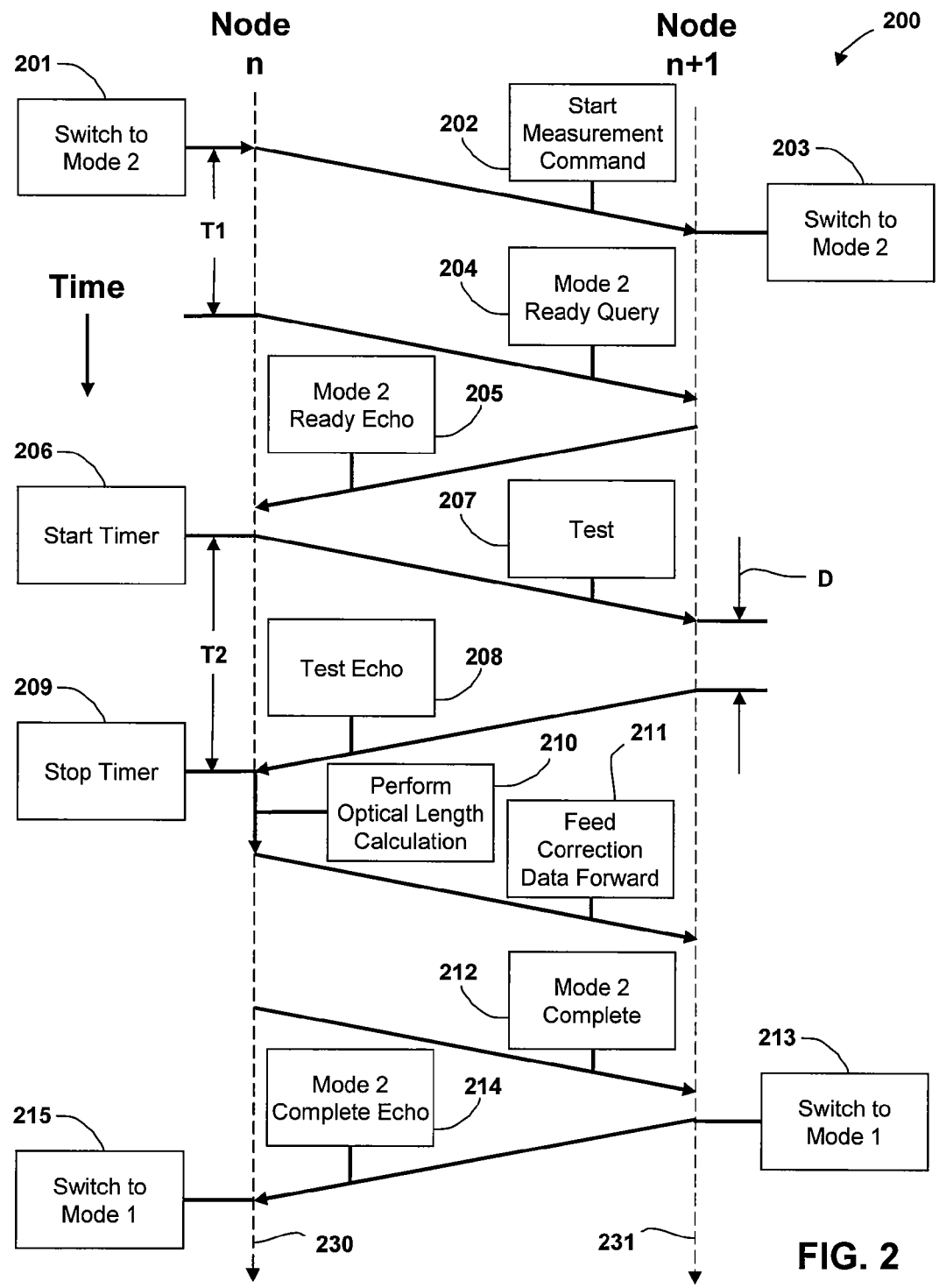
FIG. 2 is a sequence diagram illustrating an optical distance measurement protocol, according to one embodiment of the invention.

FIG. 2 is a sequence diagram illustrating an optical distance measurement protocol 200, according to one embodiment of the invention. Optical distance measurement protocol 200 is conducted by the OSC modules of two adjacent nodes of an optical system, n, n+1, which are substantially similar to nodes 101, 102 of FIG. 1 in organization and operation. Vertical lines 230, 231 represent the passage of time for nodes n, n+1, respectively, with time flowing from top to bottom of FIG. 2.

In step 201, node n is operating in Mode 1, which is the normal OSC mode, and receives a command from optical network 100 to switch to Mode 2, which is an optical distance measurement mode. An FPGA integral to node n takes control of the OSC module of node n, overriding normal OSC operation, and begins the optical distance measurement protocol for measuring the optical distance between nodes n and n+1. As described above in conjunction with FIG. 1, the FPGA included in node n and controlling the OSC module of node n may be a device dedicated to performing optical distance measurement protocol 200. Alternatively, this FPGA may be a device configured to control other functions of node n augmented to include the necessary logic for performing optical distance measurement protocol 200.

In step 202, a start measurement command is transmitted to node n+1 by the OSC module of node n. This command is sent at the standard OSC frequency. In one embodiment, the start measurement command, queries, echoes, and other signals transmitted between nodes n and n+1 described herein are implemented using the user datagram protocol, or UDP. In other embodiments, other technically feasible communications protocols may be used.

In step 203, the OSC module within node n+1, receives the start measurement command and switches to Mode 2 as well.

In step 204, after a time delay, T1, the OSC module of node n transmits a Mode 2 ready query to node n+1 to confirm that node n+1 has received the start measurement command of step 202 and has switched OSC operations to Mode 2. If a predetermined time elapses without node n receiving the Mode 2 ready echo of step 205, described below, then node n may re-send the Mode 2 ready query to node n+1.

In step 205, the OSC module of node n+1 sends a Mode 2 ready echo to the OSC module of node n, confirming that node n+1 has switched to Mode 2 and is ready to begin optical distance measurement between nodes n and n+1.

In step 206, the OSC module of node n starts a timer and begins measuring the duration of a time interval, T2, where time interval T2 corresponds to the duration of the optical distance measurement test and is used to calculate the time-of-flight of an optical signal transmitted from node n to n+1 or vice versa. By calculating the time-of-flight of an optical signal, the optical distance between nodes n and n+1 can be determined, as described below.

In step 207, the OSC module within node n transmits a first timing signal to the OSC of node n+1. Assuming OSC speed of 100 Mbit/s Ethernet, one bit resolution will correspond to 10 ns or 2 m in distance.

In step 208, the OSC module of node n+1 transmits a second timing signal, or test echo, to the OSC module of node n. The OSC module of node n+1 transmits the test echo after receiving the first timing signal. As shown, node n+1 receives the first timing signal from node 1, the FPGA processing time causes a time delay D, and then transmits the test echo to node n. Time delay D is a fixed time interval that may be pre-programmed into the FPGA contained in node n+1 that controls the operation of node n+1 when in Mode 2. The FPGA process time is not zero. Overlook of this delay time will cause a system error of the measurement. One method to test this fixed delay time is to transfer the signal between two nodes with a set of fixed fiber lengths. The time interval is a linear function of fiber length. The delay time should be the time as fiber length is zero.

In step 209, the OSC module of node n stops the timer for the optical distance measurement test.

In step 210, the FPGA in node n determines the time-of-flight of an optical signal transmitted from node n to node n+1, and then performs an optical length calculation. Time-of-flight, t, is a function of time delay D and time interval T2, as indicated in Equation (1):

$$T2 = 2t + D \quad (1)$$

Because time interval T2 and time delay D are known after step 209, the time-of-flight can be computed using Equation (1). Once time-of-flight t is known, optical distance $d_o$ can be solved for directly using Equation (2):

$$c_\lambda = (d_o) \times (1/t) \quad (2)$$

where, $c_\lambda$ is the speed of a light pulse having a known wavelength and traveling through a medium connecting the two nodes, $d_o$ is the optical distance between the two nodes, which is the product of the physical distance between the nodes and the refractive index of the medium connecting the nodes, and t is the "time of flight," i.e., the time required for the light pulse to travel from one node to the next.

Because $c_\lambda$ is known for any wavelength of light, Equation (2) indicates that by measuring time t, the optical distance $d_o$ can be computed when the wavelength of a light pulse is known. In this way, the effective optical distance of an optical link is determined empirically, and it is not necessary to estimate or compute the chromatic dispersion produced by every component of the optical link between two nodes. Advantageously, embodiments of the invention precisely measure the effective optical distance of the entire optical link.

Given optical distance $d_o$, the magnitude of chromatic dispersion for any wavelength of light transmitted over optical distance $d_o$ can be calculated using methods well-known in the art. The accuracy depends on the time resolution of the FPGA. Fast FPGAs can achieve 1 ns resolution, which corresponds to 0.2 m distance resolution. Thus, the magnitude of chromatic dispersion produced in each wavelength channel of an optical network, when transmitted through the optical link having an optical distance $d_o$, can be determined.

In step 211, the OSC module in node n feeds forward the required chromatic dispersion correction data to a TDC unit contained in node n+1. In this way, when a wavelength channel is transmitted from node n to node n+1, the TDC unit in node n+1 is configured to perform post-compensation of chromatic dispersion produced by the optical link between nodes n and n+1. Similarly, the OSC module of node n may provide the required chromatic dispersion correction data to a TDC unit contained in node n for post-compensation of a wavelength channel transmitted from node n+1 to node n.

In step 212, the OSC module of node n transmits a Mode 2 complete command to the OSC module of node n+1.

In step 213 the OSC module of node n+1 receives the Mode 2 complete command from node n, sends a Mode 2 complete echo to node n, and switches from Mode 2 to Mode 1, to provide conventional OSC communications with adjacent nodes in optical network 100.

In step 214, the Mode 2 complete echo is transmitted to the OSC module of node n via the optical link between nodes n and n+1.

In step 215, the OSC module of node n switches to Mode 1, i.e., normal OSC mode, and is again configured to provide conventional OSC communications with adjacent nodes in optical network 100.

In addition to optical distance measurement protocol 200, embodiments of the invention contemplate other protocols for using OSC modules to measure the optical distance between the nodes of an optical network. For example, rather than transmitting a wavelength channel from one node to another and then performing post-compensation on the wavelength channel, pre-compensation may be performed on the wavelength channel prior to transmission thereof. To perform pre-compensation, step 211 of optical distance measurement protocol 200 is modified. In this case, the FPGA of the transmitting node, e.g., node n, performs the optical distance calculation as described in step 210, but in step 211, the OSC module of the transmitting node does not feed forward the chromatic dispersion correction data to the TDC unit in the receiving node, e.g., node n+1. Instead, the chromatic dispersion correction data is sent to a TDC unit included in the transmitting node, and wavelength channels are each modified prior being transmitted from node n. The level of pre-compensation performed by the TDC unit on each wavelength channel is selected so that, after transmission via the optical link, each wavelength channel is properly aligned in time with the other wavelength channels and is substantially free of pulse spreading.

In another embodiment, the optical distance measurement protocol 200 may be applied to OSC modules that do not transmit signals via an Ethernet protocol.

Embodiments of the invention contemplate the periodic measurement of chromatic dispersion in each optic link of a network to allow precise readjustment of TDC in response to reconfiguration of an optical network and/or to incremental changes in environmental factors that affect chromatic dispersion. For example, optical distance measurement protocol 200 may be performed multiple times a day between nodes of an optical network, or even multiple times an hour, if necessary. Thus, despite continuous variation in the chromatic dispersion produced by thermally induced strain and other environmental factors, TDC of the resultant chromatic dispersion at a node can be optimized by updating TDC algorithms with the most current optical distance measured between nodes of the network.

Similarly, whenever an optical network reconfigures a link between nodes, optical distance measurement protocol 200 may be performed, thereby allowing TDC to correct signals between the nodes based on an accurately measured optical distance for the reconfigured optical link.

Embodiments of the invention may also be beneficially performed at the initial startup of an optical network. Little or no additional hardware is required to enable the nodes of an optical network to perform the optical distance measurements as described herein. Therefore, the disclosed technique is cost-effective compared to using external test equipment and/or other resources for determining the chromatic dispersion of each optical link in a network upon startup. Further, the disclosed measurement techniques may be performed remotely and in an automated fashion, eliminating the need for costly and time-consuming field testing of the different optical links an optical communications system.

While the foregoing is directed to embodiments of the present invention, other and further embodiments of the invention may be devised without departing from the basic scope thereof, and the scope thereof is determined by the claims that follow.

What is claimed is:

1. A method of determining an optical distance between two nodes in an optical network, the method comprising:
    transmitting a first timing signal from a first node of the optical network to a second node of the optical network via an optical supervisory channel;
    transmitting a second timing signal from the second node to the first node via the optical supervisory channel;
    measuring a time interval between when the first timing signal is transmitted from the first node and the second time signal is received by the first node;
    calculating the optical distance between the first and second nodes based on the time interval;
    calculating the magnitude of chromatic dispersion produced in a wavelength channel of the optical network when the wavelength channel is transmitted from the first node to the second node;
    providing the magnitude of chromatic dispersion produced in the wavelength channel to a tunable dispersion compensation unit; and
    compensating for the chromatic dispersion produced in the wavelength channel using the tunable dispersion compensation unit.

2. The method of claim 1, further comprising the step of adding a time delay between when the second node receives the first timing signal and when the second node transmits the second timing signal.

3. The method of claim 1, wherein the step of measuring the time interval is performed by a field-programmable gate array included with the first node.

4. The method of claim 1, wherein the first timing signal and the second timing signal are transmitted using user datagram protocol (UDP).

5. The method of claim 1, further comprising the step of interrupting an optical signal transmitted between the first node and the second node via the optical supervisory channel prior to transmitting the first timing signal from the first node.

6. The method of claim 5, wherein the first timing signal has substantially the same frequency as the interrupted optical signal.

7. The method of claim 5, wherein the step of interrupting the optical signal further comprises:
    switching the first node to a distance measurement mode; and
    in response to a command from the first node, switching the second node to a distance measurement mode.

8. The method of claim 7, wherein the command signal is a UDP-based signal.

9. The method of claim 1, wherein the steps of transmitting the first and second timing signals, measuring the time interval and calculating the optical distance are performed periodically.

10. The method of claim 9, wherein periodically comprises at least once per hour.

11. The method of claim 1, wherein the tunable dispersion compensation unit is included in the first node and the step of compensating for the chromatic dispersion comprises pre-compensation.

12. The method of claim 1, wherein the step of compensating for the chromatic dispersion comprises post-compensation and the tunable dispersion compensation unit is included in the second node.

13. An optical network, comprising:
    a first node; and
    a second node optically coupled to the first node via an optical link, wherein the first node includes:
        a first opto-electrical transceiver configured to transmit and receive optical supervisory channel (OSC) signals to and from the second node via the optical link,
        a first field-programmable gate array (FPGA) programmed to control the first opto-electrical transceiver in a measurement mode, and
        a tunable dispersion compensation module,
    wherein the second node includes:
        a second opto-electrical transceiver configured to receive and transmit the OSC signals from and to the first node via the optical link, and a second FPGA programmed to control the second opto-electrical transceiver in the measurement mode, and wherein the first FPGA and the second FPGA, when in the measurement mode, are configured to compute an optical distance between the first node and the second node based on the OSC signals, and the tunable dispersion compensation module is configured to modify a data signal transmitted to the second node based on the computed optical distance to reduce chromatic dispersion produced by the optical link.

14. The optical network of claim 13, wherein the optical distance is determined based on a time-of-flight of the OSC signals between the first node and the second node.

15. The optical network of claim 13, wherein the first FPGA is included within the tunable dispersion compensation module.

16. The optical network of claim 13, wherein the second node further includes a tunable dispersion compensation module configured to modify a data signal received from the first node based on the computed optical distance to reduce chromatic dispersion produced by the optical link.

17. The optical network of claim 16, wherein the second FPGA is included within the tunable dispersion compensation module.

18. An optical network, comprising:
a first node; and
a second node optically coupled to the first node via an optical link,
wherein the first node includes:
    a first opto-electrical transceiver configured to transmit and receive optical supervisory channel (OSC) signals to and from the second node via the optical link,
    a first field-programmable gate array (FPGA) programmed to control the first opto-electrical transceiver in a measurement mode, and
    a first PHY chip programmed to control the first opto-electric transceiver in a standard mode, and a switching module configured to switch control of the first opto-electrical transceiver between the first FPGA and the first PHY chip,
wherein the second node includes:
    a second opto-electrical transceiver configured to receive and transmit the OSC signals from and to the first node via the optical link,
    a second FPGA programmed to control the second opto-electrical transceiver in the measurement mode,
    a second PHY chip programmed to control the second opto-electric transceiver in a standard mode, and a switching module configured to switch control of the second opto-electrical transceiver between the second FPGA and the second PHY chip, and
wherein the first FPGA and the second FPGA, when in the measurement mode, are configured to compute an optical distance between the first node and the second node based on the OSC signals.

19. An optical network, comprising:
a first node; and
a second node optically coupled to the first node via an optical link,
wherein the first node includes:
    a first opto-electrical transceiver configured to transmit and receive optical supervisory channel (OSC) signals to and from the second node via the optical link, and
    a first field-programmable gate array (FPGA) programmed to control the first opto-electrical transceiver in a measurement mode,
wherein the second node includes:
    a second opto-electrical transceiver configured to receive and transmit the OSC signals from and to the first node via the optical link, and
    a second FPGA programmed to control the second opto-electrical transceiver in the measurement mode, and
wherein the first FPGA and the second FPGA, when in the measurement mode, are configured to compute an optical distance between the first node and the second node based on the OSC signals and wherein the OSC signals are based on a user datagram protocol.

* * * * *